3,823,026
METHOD FOR THE FABRICATION OF COMPOSITE INSULATIONS
Gerhart Brunar, Vienna, Austria, assignor to Meynadier & Cie Aktiengesellschaft, Zurich, Switzerland
No Drawing. Filed Jan. 21, 1972, Ser. No. 219,894
Claims priority, application Switzerland, Feb. 1, 1971, 1,428/71
Int. Cl. B44d *1/12, 1/16*
U.S. Cl. 117—72        23 Claims

ABSTRACT OF THE DISCLOSURE

A method for the fabrication of a composite insulation for structures composed of at least two layers of different composition and different mechanical properties, comprising the steps of initially providing the surface to be insulated with a plastic insulation layer formed of bitumen, tar, bitumen-latex or tar-latex in that there is simultaneously and separately applied the material which is present in the form of a dispersion i.e. an emulsion or suspension and a precipitating agent, and thereafter applying to the plastic insulation layer an elastic rubber layer by simultaneously or separately applying a latex i.e. emulsion or suspension and a precipitating agent.

BACKGROUND AND SUMMARY OF THE INVENTION

The present invention relates to a new and improved method for the fabrication of composite or compound insulations for the sealing of structures and the use thereof in the construction of structures both above ground as well as subterranean structures.

The prior art has been acquainted for quite some time with the technique of applying layers of bitumen or tar for the purpose of producing a watertight insulation for structures. At the present time there is primarily employed the so-called hydro-insulation technique, as such for instance has been disclosed in Austrian Pat. 232,243, Czechoslovakian Pat. 104,364, British Pat. 1,167,265 and German Patent publication 1,929,302. According to these known techniques a bitumen emulsion or tar emulsion is precipitated into a coherent layer with the aid of precipitation agents or precipitants which are simultaneously yet separately applied to the surface or substrate. The precipitating agent can be in liquidous or solid form.

The known bitumen- or tar emulsions oftentimes contain a small quantity, usually 5 to 20 percent, of natural or synthetic latexes for improving the stability or strength of the insulation layer.

These prior art insulation layers possess marked plasticity and therefore are readily elongatable and workable. However, the inherent strength of the layers, even with the addition of latex, remains slight, so that it is necessary to provide a further coating, for instance formed of cement mortar in order to protect against mechanical load and damage.

A possibility for increasing the resistance of the plastic installation layer with regard to mechanical loads resides in the feature of applying reinforcements formed of glass-metal- or plastic fabrics or webs. Yet, it is difficult to apply such reinforcements to the above-discussed insulation layers. If the surface which is to be provided with insulation is irregular, as is oftentimes the case when constructing underground galleries or tunnels, then, as a practical matter, the installation of such reinforcements is almost impossible.

To facilitate release of water present during coagulation the hydro-insulation is normally sprayed-on in stages in a number of layers. Owing to the characteristic black color of bitumen or tar it is practically impossible to determine whether each layer affords a coherent coating of requisite strength.

Accordingly, there is still present a real need in the art for improved methods for the fabrication of composite insulations not associated with the aforementioned drawbacks and limitations of the prior art techniques. Hence, a primary objective of the present invention is to provide just such improved method for the fabrication of such composite or compound insulations in a manner overcoming the previously discussed disadvantages and while effectively and reliably fulfilling the existing need in the art.

Still a further object of this invention relates to a new and improved method for the fabrication of an insulation layer without the drawbacks of the previously discussed insulations produced by the state-of-the-art techniques.

Yet a further significant object of the present invention relates to a novel method of economically and reliably producing an insulation layer having improved properties in a relatively uncomplicated and efficient fashion.

DETAILED DISCUSSION OF THE INVENTION

Now, in order to implement these and still further objects of the invention, which will become more readily apparent as the description proceeds, the inventive method for the fabrication of a composite insulation for structures composed of at least two layers of different composition and different mechanical properties is manifested by the features that the surface to be insulated is initially provided with a plastic insulation layer formed of bitumen or tar or a mixture of bitumen and rubber latex or a mixture of tar and rubber latex in that there is simultaneously yet separately applied the material which is present in the form of a dispersion, that is an emulsion or suspension and a precipitating agent, and thereafter an elastic rubber layer is applied to the plastic insulation by simultaneously yet separately applying a rubber latex dispersion, that is a rubber latex emulsion or suspension and a precipitating agent.

By means of the rubber layer which is produced in situ there is obtained a highly elastic coating which securely and faultlessly adheres to the bitumen- or tar substrate or surface and practically can not be damaged by mechanical load. The last-mentioned aspect is of considerable importance since the insulation is continuously subjected to the danger of mechanical damage owing to the progressive construction work. The movement or shifting of the subterrain, which can arise under circumstances, and the stresses resulting at the superimposed coating are taken-up by the plastic layer and diminished to such an extent that the elastic layer is not affected. The thus nonloaded rubber layer retains its original uniform thickness and forms a protection both against mechanical load resulting from the construction work as well as also against the effects of hydrostatic pressure. The crack pressure strength is particularly improved, as such can be determined by DIN-standard (German Industrial Standard) 16 935/6.3.

The rubber layer simultaneously functions in the manner of a reinforcement and in contrast to the known reinforcements can be also applied to uneven or irregular surfaces.

Furthermore, by virtue of the different coloration of the different materials applied to the substrate or surface it is possible to faultlessly control whether the individual layers have produced a coherent layer of requisite strength. Upon interruption of the work it is possible to immediately ascertain which was the last applied layer and where such terminates, something not possible when working with a single material appearing in a number of layers.

The individual layers can be applied in a single coating or a number of coatings to the surface to be insulated, application being preferably by spraying. The number of layers preferably amounts to a maximum of three, but two is preferred. In the case of the plastic layer the layer thickness can be in the range of 2–10 millimeters, preferably 2–5 millimeters, and in the case of the elastic layer 0.5–3 millimeters, preferably 1–2 millimeters. Where three layers are employed a further plastic layer, preferably of the same composition as the first applied plastic rubber, may be applied onto the elastic latex layer.

Suitable as the liquid precipitating agents are, for instance, oppositely charged emulsions, latexes and aqueous solutions of mineral acids and their salts. For instance, there may be employed a thinned aqueous solution of calcium chloride. As solid precipitating agents there can be employed dry or wetted pulverulent materials, such as cement (Portland cement), hydraulic lime, gypsum, and anhydrite, caustic lime, bentonite, fuller's or bleaching earth, kaolin, submicroscopic finely-divided silicic acid (for instance sold under the trademarks "Aerosil" or "Aerosile" of the well-known German concern Degussa Inc.), natural pozzolanas, such as diatomaceous earth, trass, artificial pozzolanas, such as finely-ground glass furnace slag or brick dust, slate dust, activated carbon or charcoal, and carbon black or other slurries or suspensions. A precipitating agent can be used alone or in combination with one or a number of others which are applied to the surface.

For the formation of the rubber layer there are suitable the known commercially available latexes, such as polychloroprene latexes, acrylonitrile latexes, styrene-butadiene latexes or natural rubber latexes. The latexes normally produce white-yellow layers, yet they can however be fabricated of optional color by the addition of suitable pigments. For instance, it appears possible to employ iron oxides compatible with the insulation layer and which do not impair its age resistance. An example of a suitable pigment or dye is the commercially available product Vulcanosolcarmin 428 of the well-known German concern BASF, Ludwigshafen, Germany, which is a monoazo pigment with a color index of 12490.

The properties of the rubber layer can be modified by the addition of plasticizers, resins, fillers and so forth. Additionally, it is advantageous to add to the employed material aging resisting or protective agents. A commercially available aging protective agent of the well known German concern Farbenfabriken Bayer, Leverkusen, sold under the designation "Alterungsschutzmittel DDA EM 50%" can be employed, which is a diphenylamine derivative.

The invention will now be further explained in conjunction with a number of Examples given hereinafter for purposes of further illustratively clarifying the inventive concepts. It is to be understood that in the Examples given hereinafter the percentages relate to percent by weight of the relevant component. Also as a clarifying remark it might be indicated that initially there will be given Examples of the plastic layer and then the elastic layer.

Example 1 (Example of plastic layer)

Component A: anionic bitumen-polymer (latex) emulsion C (60% bitumen). Ratio of polymer:bitumen=14:86.
Component B: thinned aqueous solution of calcium chloride
Mixing ratio: $A:B=100:12$.

The composition of the above-mentioned bitumen-polymer emulsion C is as follows: 86% by weight of an anionic bitumen emulsion B 200 (a distillation bitumen possessing an average needle penetration of 200) and 14% by weight of commercially available polymer dispersion C, wherein this polymer dispersion C is an emulsion copolymer formed of 2-chlorobutadiene with the following properties:

| | |
|---|---|
| Solid content, percent | 60 |
| Water content, percent | 40 |
| pH-value | 13 |
| Density of the dry substance | 1.23 |

Further details of the commercially available anionic bitumen emulsion B 200 have been disclosed in the commonly assigned United States application, Ser. No. 118,556, filed Feb. 24, 1971 and entitled "Method for Fabricating an Insulation Layer for Sealing Structures."

Example 2 (Example of plastic layer)

Component A: anionic tar-polymer (latex) emulsion C (60%) (polymer:tar=14:86)
Component B: thinned aqueous solution of calcium chloride
Mixing ratio: $A:B=100:15$ The composition of the tar emulsion is as follows:

| | Percent |
|---|---|
| Tar 70/30 | 60.0 |
| "NEKAL-BX" (sodium salt of diisobutyl naphthalenesulfonic acid) (Trademarked product of General Aniline & Film Co.) | 0.5 |
| Casein | 1.0 |
| Potash lime | 0.5 |
| Water | 38.0 |

Tar 70/30 disclosed above is a prepared tar consisting of 70 parts by weight hard coal pitch (65–75° Kraemer Sarnow) and 30 parts by weight carbolinium. The polymer emulsion C is that disclosed above in Example 1.

Example 3 (Example of elastic layer)

Component A: Parts by weight

| | |
|---|---|
| Polymer dispersion C (as disclosed in Example 1 above) | 100 |
| Aging protective agent (commercially available "Alterungsschutzmittel DDA EM 50%"—Registered Trademark of Farbenfabriken Bayer, Leverkusen) | 4 |
| ZnO | 5 |
| Water | 9.5 |
| "Vultamol" (sodium salt of a naphthalenesulfonic acid product) (Registred Trademark of well-known German concern BASF, Ludwigshafen, Germany) | 0.5 |

Component B: thinner aqueous solution of calcium chloride
Mixing ratio: $A:B=100.15$ Example 4 (Example of elastic layer)

Component A: same as above Example 3
Component B: Portland cement
Mixing ratio: $A:B=100:30$ Example 5 (Example of elastic layer)

Component A: Parts by weight

| | |
|---|---|
| Polymer emulsion C (same as above Example 1) | 100 |
| Aging protective agent (commercially available "Alterungsschutzmittel DDA EM 50%"—Registered Trademark of Farbenfabriken Bayer, Leverkusen) | 4 |
| ZnO | 5 |
| Kaolin | 15 |
| Water | 9.5 |
| "Vultamol" (sodium salt of a naphthalenesulfonic acid product) (Registered Trademark of well-known German concern BASF, Ludwigshafen, Germany) | 0.5 |
| "Vulcanosolcarmin 428" (Registered Trademark of BASF, Ludwigshafen) | 0.5 |

Component B: thinned aqueous solution of calcium chloride
Mixing ratio: $A:B=100:15$ The inventively fabricated composite insulation can be used both in structures above ground as well as subterranean structures. It is particularly suitable for subterranean construction work. Preferred fields of use of the inventive method are for the erection of galleries and tunnels.

While there is shown and described present preferred embodiments of the invention, it is to be distinctly understood that the invention is not limited thereto but may be otherwise variously embodied and practiced within the scope of the following claims.

Accordingly what is claimed is:

1. A method for the fabrication of a composite insulation for structures composed of at least two layers of different composition and different mechanical properties, comprising the steps of coating the surface to be insulated with (1) a dispersion of a material selected from the group consisting of bitumen, tar, bitumen-latex or tar-latex while simultaneously but separately applying to the surface a precipitating agent for such dispersion, to thus form a plastic insulation layer, and thereafter (2) coating onto such plastic insulation layer a non-bituminous latex composition, wherein said latex composition consists essentially of a rubber latex, and a precipitating agent to thus form an elastic rubber layer.

2. The method as defined in claim 1, wherein said material of the plastic layer is present in the form of an emulsion.

3. The method as defined in claim 1, wherein said material of the plastic layer is present in the form of a suspension.

4. The method as defined in claim 1, wherein said rubber latex dispersion of said elastic layer is present in the form of an emulsion.

5. The method as defined in claim 1, wherein said rubber latex dispersion of said elastic layer is present in the form of a suspension.

6. The method as defined in claim 1, wherein the rubber latex dispersion and precipitating agent of the elastic layer are simultaneously applied.

7. The method as defined in claim 1, wherein the rubber latex dispersion and precipitating agent of the elastic layer are separately applied.

8. The method as defined in claim 1, further including the steps of applying to the elastic layer a further plastic layer.

9. The method as defined in claim 1, including the step of forming the composite insulation from a maximum of three layers.

10. The method as defined in claim 1, wherein the precipitating agent comprises oppositely charged emulsions or suspensions.

11. The method as defined in claim 1, including the step of using as the precipitating agent an aqueous solution of mineral acids and their salts.

12. The method as defined in claim 1, including the step of using as the precipitating agent dry or wetted powdery materials or their slurries.

13. The method as defined in claim 1, wherein said rubber latex composition includes additives.

14. The method as defined in claim 13, wherein said additives comprise a member selected from the group consisting of fillers, plasticizers and resins.

15. The method as defined in claim 1, including the step of adding an aging protective agent to the rubber of the elastic layer.

16. The method as defined in claim 1, including the step of coloring the rubber of the elastic layer.

17. The method as defined in claim 1, including the step of controlling the layer thickness of the plastic layer so as to be in a range between 2–10 millimeters and that of the elastic layer to be in a range between 0.5–3 millimeters.

18. The method as defined in claim 17, wherein the plastic layer has a layer thickness in the range of 2–5 millimeters and the elastic layer has a layer thickness in the range of 1–2 millimeters.

19. The method as defined in claim 1, wherein the insulation layer is employed for an aboveground structure.

20. The method as defined in claim 1, wherein the insulation layer is employed for a subterranean structure.

21. The method as defined in claim 1, wherein the insulation layer is employed in tunnel constructions.

22. The method as defined in claim 1, wherein the insulation layer is employed in the construction of a gallery.

23. The method as defined in claim 1, wherein said rubber latex is taken from the group consisting of polychloroprene, acrylonitrile, styrene-butadiene, and natural rubber.

References Cited

UNITED STATES PATENTS

| 3,667,998 | 6/1972 | Esser | 117—105.5 |
| 3,257,231 | 6/1966 | McEachran et al. | 117—105.5 |
| 3,257,229 | 6/1966 | Nielsen | 117—105.5 |
| 3,676,198 | 7/1972 | McGroarty | 117—105.5 |

FOREIGN PATENTS

| 1,167,265 | 10/1969 | Great Britain | 117—105.5 |

DANIEL J. FRITSCH, Primary Examiner

U.S. Cl. X.R.

117—77, 92, 104 A, 104 B, 105.5, 163, 168